US012614041B2

(12) United States Patent
Yu et al.

(10) Patent No.: US 12,614,041 B2
(45) Date of Patent: Apr. 28, 2026

(54) NONVERBAL MESSAGE EXTRACTION AND GENERATION

(71) Applicant: TENCENT AMERICA LLC, Palo Alto, CA (US)

(72) Inventors: Dian Yu, Bellevue, WA (US); Xiaoyang Wang, Palo Alto, CA (US); Haitao Mi, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 201 days.

(21) Appl. No.: 18/384,428

(22) Filed: Oct. 27, 2023

(65) Prior Publication Data

US 2025/0139389 A1 May 1, 2025

(51) Int. Cl.
*G06F 40/56* (2020.01)
*G06F 18/211* (2023.01)
*G06F 18/2415* (2023.01)
*G06F 40/30* (2020.01)

(52) U.S. Cl.
CPC ............ *G06F 40/56* (2020.01); *G06F 18/211* (2023.01); *G06F 18/2415* (2023.01); *G06F 40/30* (2020.01)

(58) Field of Classification Search
None
See application file for complete search history.

(56) References Cited

U.S. PATENT DOCUMENTS

| | | | | |
|---|---|---|---|---|
| 9,495,955 | B1 * | 11/2016 | Weber | G10L 15/063 |
| 10,037,313 | B2 * | 7/2018 | Wang | G10L 25/78 |
| 10,558,421 | B2 * | 2/2020 | Abuelsaad | H04M 3/569 |
| 2008/0195373 | A1 | 8/2008 | Ander et al. | |
| 2009/0012788 | A1 | 1/2009 | Gilbert et al. | |
| 2014/0046661 | A1 | 2/2014 | Bruner | |
| 2015/0052120 | A1 * | 2/2015 | Bhatia | G06F 16/24578 |
| | | | | 707/723 |
| 2017/0277684 | A1 | 9/2017 | Dharmarajan Mary | |
| 2021/0407512 | A1 * | 12/2021 | Moore | G10L 15/26 |
| 2022/0327309 | A1 | 10/2022 | Carlock et al. | |

OTHER PUBLICATIONS

International Search Report issued Aug. 1, 2024 in International Application No. PCT/US 24/24339.
Written Opinion issued Aug. 1, 2024 in International Application No. PCT/US 24/24339.
Andrew Vassiliou, "Analysing Film Content: A Text-Based Approach", UniS, Department of Computing School of Electronics & Physical Sciences, Jul. 2006, 195 pages.
Philip John Gorinski, et al., "Movie Script Summarization as Graph-based Scene Extraction", Human Language Technologies: The 2015 Annual Conference of the North American Chapter of the ACL, May 31-Jun. 5, 2015, pp. 1066-1076, Denver, Colorado.

(Continued)

*Primary Examiner* — Nafiz E Hoque
(74) *Attorney, Agent, or Firm* — Sughrue Mion, PLLC

(57) ABSTRACT
A method and apparatus comprising computer code configured to cause a processor or processors to receive a text comprising a plurality of sentences, by a machine learning model, extract a nonverbal message from one of the sentences and add an annotation to the text, the annotation indicating the nonverbal message, and output a version of the text including the annotation.

18 Claims, 20 Drawing Sheets

400

401

402

403

404

(56)                References Cited

OTHER PUBLICATIONS

Philip John Gorinski, et al., "What's this Movie about? A Joint Neural Network Architecture for Movie Content Analysis", Proceedings of NAACL-HLT 2018, Jun. 1-6, 2018, pp. 1770-1781, New Orleans, Louisiana.

Kai Sun, et al., "Improving Machine Reading Comprehension with Contextualized Commonsense Knowledge", Proceedings of the 60th Annual Meeting of the Association for Computational Linguistics, May 22-27, 2022, pp. 8736-8747, vol. 1.

Apoorv Agarwal, et al., "Parsing Screenplays for Extracting Social Networks from Movies", Proceedings of the 3rd Workshop on Computational Linguistics for Literature, Apr. 27, 2014, pp. 50-58, Gothenburg, Sweden.

Fionn Murtagh, et al., "The Structure of Narrative: the Case of Film Scripts", May 28, 2018, pp. 1-28.

Eun Young Ha, et al., "Combining Verbal and Nonverbal Features to Overcome the 'Information Gap' in Task-Oriented Dialogue", Proceedings of the 13th Annual Meeting of the Special Interest Group on Discourse and Dialogue (SIGDIAL), Jul. 5-6, 2012, pp. 247-256, Seoul, South Korea.

Veronica Perez-Rosas, et al., "Verbal and Nonverbal Clues for Real-life Deception Detection", Proceedings of the 2015 Conference on Empirical Methods in Natural Language Processing, Sep. 17-21, 2015, pp. 2336-2346, Lisbon, Portugal.

Michan Kim, et al., "Expressive Text-to-Speech using Style Tag", Oct. 6, 2022, 5 pages, Department of Electrical and Computer Engineering and INMC, Seoul National University, Seoul, South Korea, SK Telecom.

Kai Sun, et al., "Investigating Prior Knowledge for Challenging Chinese Machine Reading Comprehension", Transactions of the Association for Computational Linguistics, 2020, pp. 141-155, vol. 8.

Dian Yu, et al., "End-to-End Chinese Speaker Identification", Proceedings of the 2022 Conference of the North American Chapter of the Association for Computational Linguistics: Human Language Technologies, Jul. 10-15, 2022, pp. 2274-2285.

Jacob Devlin, et al., "BERT: Pre-training of Deep Bidirectional Transformers for Language Understanding", May 24, 2019, 16 pages.

Elad Segal, et al., "A Simple and Effective Model for Answering Multi-span Questions", Proceedings of the 2020 Conference on Empirical Methods in Natural Language Processing, Nov. 16-20, 2020, pp. 3074-3080.

Junjie Yang, et al., "Multi-span Style Extraction for Generative Reading Comprehension", Dec. 28, 2020, 9 pages.

Colin Raffel, et al., "Exploring the Limits of Transfer Learning with a Unified Text-to-Text Transformer", Journal of Machine Learning Research 21, 2020, pp. 1-67.

Qizhe Xie, et al., "Self-training with Noisy Student improves ImageNet classification", Jun. 19, 2020, pp. 1-18.

Yiming Cui, et al., "Pre-Training with Whole Word Masking for Chinese Bert", IEEE/ACM Transactions on Audio, Speech, and Language Processing, Nov. 2021, pp. 1-11.

Zhe Zhao, et al., "UER: An Open-Source Toolkit for Pre-training Models", Sep. 12, 2019, 6 pages, School of Information and Deke, Moe, Renmin University of China, Beijing, China, Tencent AI Lab, School of Electronics Engineering and Computer Science, Peking University, Beijing, China.

Robyn Speer, et al., ConceptNet 5.5: An Open Multilingual Graph of General Knowledge, Dec. 11, 2018, 9 pages.

Yida Wang, et al., "A Large-Scale Chinese Short-Text Conversation Dataset", Apr. 26, 2022, 12 pages.

Hao Zhou, et al., "Emotional Chatting Machine: Emotional Conversation Generation with Internal and External Memory", Jun. 1, 2018, 9 pages.

Hao Zhou, et al., "KdConv: A Chinese Multi-domain Dialogue Dataset Towards Multi-turn Knowledge-driven Conversation", Apr. 8, 2020, 13 pages.

* cited by examiner

| metric | value |
|---|---|
| number of training instances | 3,791 |
| number of development instances | 341 |
| average/max length (in characters) of context* | 148 / 490 |
| average/max length (in characters) of NM | 4.7 / 33 |

| extractor | model | input | EM↑ | F1↑ |
|---|---|---|---|---|
| pattern-based | - | cat(context$_1$, context$_2$) | 41.6 | 62.5 |
| extractive | MacBERT$_{large}$ | utterance [SEP] cat(context$_1$, utterance, context$_2$) | 74.3 (0.81) | 88.1 (0.41) |
| extractive | RoBERTa-wwm-ext-large | utterance [SEP] cat(context$_1$, utterance, context$_2$) | 74.9 (0.33) | 88.5 (0.21) |
| generative | BART$_{large}$ | context$_1$ | 72.0 (3.24) | 86.7 (0.66) |
| generative | T5$_{base}$ | context$_1$ | 74.0 (1.11) | 88.0 (0.37) |
| generative | DialBART$_{large}$ | context$_1$ | 76.4 (0.79) | 89.0 (0.39) |
| generative | DialBART$_{large}$ | context$_1$ [SEP] context$_2$ | 75.0 (0.74) | 88.1 (0.60) |
| generative | DialBART$_{large}$ | context$_1$ [SEP] utterance [SEP] context$_2$ | 74.2 (0.66) | 87.9 (0.62) |

| training data/method | model | type | F1↑ | ROUGE-1↑ | ROUGE-L↑ | DIST-1↑ | DIST-2↑ | ID |
|---|---|---|---|---|---|---|---|---|
| majority | | weak | 3.18 | 3.20 | 3.20 | 0.06 | 0.06 | 1 |
| CSK (Speer et al. 2017) | T5_xxl | indirect | 1.94 (0.15) | 2.02 (0.15) | 1.99 (0.18) | 10.05 (2.17) | 17.44 (2.61) | 2 |
| ScriptION | T5_xxl | direct | 7.30 (1.26) | 7.70 (1.35) | 7.02 (1.33) | 7.49 (0.07) | 18.22 (0.05) | 3 |
| ScriptION | BART_xxl | direct | 7.49 (0.56) | 8.03 (0.74) | 7.02 (0.73) | 6.65 (3.63) | 13.22 (7.17) | 4 |
| | DialBART_xxl | indirect | 2.92 | 3.36 | 3.23 | 10.23 | 43.35 | 5 |
| ScriptION | DialBART_xxl | semi | 7.65 (0.31) | 8.29 (0.30) | 8.15 (0.30) | 10.12 (0.40) | 20.03 (0.68) | 6 |
| Novel_person | T5_xxl | weak | 4.58 (0.18) | 4.96 (0.18) | 4.89 (0.18) | 5.51 (0.28) | 11.22 (0.63) | 7 |
| Novel_location | T5_xxl | weak | 4.54 (0.18) | 4.95 (0.21) | 4.92 (0.21) | 14.68 (0.38) | 36.69 (0.84) | 8 |
| Novel_scene | T5_xxl | weak | 4.83 (0.23) | 5.28 (0.26) | 5.24 (0.26) | 15.64 (0.17) | 40.01 (0.82) | 9 |
| Novel_person → ScriptION | T5_xxl | semi | 7.66 (0.22) | 8.39 (0.23) | 8.44 (0.22) | 9.96 (0.33) | 22.32 (0.62) | 10 |
| Novel_location → ScriptION | T5_xxl | semi | 7.53 (0.25) | 8.18 (0.26) | 8.08 (0.28) | 10.03 (0.25) | 22.32 (0.82) | 11 |
| Novel_scene → ScriptION | T5_xxl | semi | 7.83 (0.37) | 8.44 (0.37) | 8.35 (0.35) | 10.37 (0.48) | 22.76 (0.54) | 12 |
| Novel_person → ScriptION | DialBART_xxl | semi | 7.87 (0.25) | 8.50 (0.28) | 8.40 (0.27) | 10.15 (0.62) | 21.15 (1.43) | 13 |
| Novel_location → ScriptION | DialBART_xxl | semi | 7.77 (0.17) | 8.44 (0.23) | 8.34 (0.17) | 10.44 (0.46) | 21.28 (0.66) | 14 |
| Novel_scene → ScriptION | DialBART_xxl | semi | 7.95 (0.22) | 8.68 (0.25) | 8.56 (0.24) | 10.45 (0.81) | 21.80 (0.95) | 15 |
| Novel_person (L) → ScriptION | DialBART_xxl | semi | 8.05 (0.24) | 8.71 (0.25) | 8.60 (0.25) | 10.02 (0.36) | 20.90 (0.78) | 16 |
| Novel_location (L) → ScriptION | DialBART_xxl | semi | 7.87 (0.18) | 8.55 (0.16) | 8.44 (0.18) | 10.62 (0.42) | 21.39 (0.93) | 17 |
| Novel_scene (L) → ScriptION | DialBART_xxl | semi | 8.15 (0.35) | 8.84 (0.39) | 8.72 (0.38) | 10.23 (0.89) | 21.64 (0.99) | 18 |

FIG. 13

| input | F1↑ | ROUGE-1↑ | DIST-2↑ |
|---|---|---|---|
| $u_{k-1}, u_k$ | 4.83 (0.23) | 5.28 (0.26) | 40.01 (0.82) |
| $u_k$ | 4.77 (0.23) | 5.05 (0.24) | 6.11 (0.43) |
| $u_{k-2}, u_{k-1}, u_k$ | 4.78 (0.22) | 5.24 (0.23) | 38.50 (1.11) |
| $u_{k-1}, s_k, u_k$ | 4.85 (0.23) | 5.28 (0.25) | 41.98 (0.96) |

| description | M1↑ | M2↑ | M3↑ | M4↑ | AVG4 | AVG3 |
|---|---|---|---|---|---|---|
| Script$_{train}$ | 61.3 | 70.0 | 76.0 | 64.7 | 68.0 | 69.1 |
| Novel$_{pattern}$ (L) | 66.0 | 73.3 | 77.3 | 81.3 | 74.5 | 72.2 |
| Novel$_{extractive}$ (L) | 50.7 | 76.0 | 85.3 | 88.0 | 75.0 | 70.7 |
| Novel$_{generative}$ (L) | 62.7 | 81.3 | 86.0 | 88.0 | 79.5 | 76.7 |
| ground truth | 72.0 | 77.3 | 83.3 | -- | -- | 77.6 |

| external source | backbone | # mpu* | dev | $C_3^2$ test |
|---|---|---|---|---|
| – | BERT$_{\text{BASE}}$ | 0 | 62.3$^{\S}$ | 62.1$^{\S}$ |
| – | RoBERTa$_{\text{LARGE}}$ | 0 | 67.3 (3.45) | 66.1 (2.19) |
| CSK | RoBERTa$_{\text{LARGE}}$ | 1 | 68.3 (0.72) | 67.0 (0.89) |
| Script | RoBERTa$_{\text{LARGE}}$ | 1 | 68.8 (1.19) | 66.3 (1.03) |
| Novel$_L$ | RoBERTa$_{\text{LARGE}}$ | 1 | 69.4 (0.46)[‡] | 67.6 (0.89)[‡] |

| external source | backbone | # mpu* | dev | EWECT test |
|---|---|---|---|---|
| – | BERT$_{\text{LARGE}}$ | 0 | 78.7$^{\S}$ | – |
| – | RoBERTa$_{\text{LARGE}}$ | 0 | 79.7 (0.25) | 78.4 (0.34) |
| CSK | RoBERTa$_{\text{LARGE}}$ | 1 | 79.4 (0.49) | 78.9 (0.20) |
| Script | RoBERTa$_{\text{LARGE}}$ | 1 | 79.4 (0.31) | 79.0 (0.47) |
| Novel$_L$ | RoBERTa$_{\text{LARGE}}$ | 1 | 80.2 (0.19)[†] | 78.8 (0.24)[‡] |

1500

1600

1610 — Input Text

1620 — Character-Based BERT

1630

1650 — Position Switcher

1640 — Segment Merger

1670 — Metric/Mark Replacer

1660 — Number Converter

1680 — Normalized Text

1910 — Input Text

1920 — BERT Model

1930 — CRF Layer

1940 — Normalized Text

NONVERBAL MESSAGE EXTRACTION AND GENERATION

BACKGROUND

1. Field

The present disclosure is directed to nonverbal message extraction and generation.

2. Description of Related Art

Nonverbal messages (NM) such as speakers' facial expressions and speed of speech are essential for face-to-face communication, and NM can be regarded as implicit knowledge as usually not included in existing dialogue understanding or generation tasks.

Previous studies merely focus on extracting NMs from relatively small-scale well-structured corpora such as movie scripts wherein NMs are enclosed in parentheses by script-writers, which greatly decreases the difficulty of extraction.

One of the most relevant text resources for nonverbal messages is TV and movie scripts. Generally, scripts are written in a standard format: for example, NMs of their corresponding utterances are enclosed in parentheses (e.g., ELIZABETH (ironically) "With five thousand a year, it would not matter if he had a big pink face." and MR DARCY (shakes his head) "You know how I detest it."), which usually describe what can be seen or heard by the audience beyond the verbal messages. Based on the well-defined screenplay structures, it is relatively easy to use heuristics to extract utterances and their NMs from scripts. However, in scripts, only a small percentage (~10.5% based on our analysis) of utterances are followed by NMs, and existing public script corpora are usually small-scale even for resource-rich English (e.g., 1,276 movies and 917 movies).

Previous studies design patterns or language-specific features to identify NMs, utterances, and speakers from well-structured (or semi-structured scripts in which they can be relatively easily extracted based on screenplay formats. To the best of our knowledge, there is no work studying the automatic extraction of NMs from unstructured corpora, and as such, existing computer technology simply is not capable of performing such features even if asked to do so.

NMs such as facial expressions and body postures are used to facilitate tasks such as dialogue act classification, deception detection, and text-to-speech. However, these messages are either pre-defined or converted based on recorded videos, making it resource-consuming to collect data and challenging to scale up for other applications. NMs extracted from scripts have been shown to be useful for tasks that require dialogue understanding such as machine reading comprehension and relation extraction. However, there is no existing use NMs extracted from unstructured data for both understanding and generation tasks nor can existing computer technology simply implement such features even if asked to do so. There is no public dataset in any language for identifying NMs in unstructured corpora.

And for any of those reasons there is therefore a desire for technical solutions to such problems that arose in computer audio technology.

SUMMARY

There is included a method and apparatus comprising memory configured to store computer program code and a processor or processors configured to access the computer program code and operate as instructed by the computer program code. The computer program is configured to cause the processor implement receiving code configured to cause the at least one processor to receive a text comprising a plurality of sentences, extracting and annotating code configured to cause the at least one processor to, by a machine learning model, extracting a nonverbal message from one of the sentences and adding an annotation to the text, the annotation indicating the nonverbal message, and outputting code configured to cause the at least one processor to output a version of the text comprising the annotation.

Extracting the nonverbal message may include determining a type of the nonverbal message, the type being at least one of a kinesics type, an internal states type, a pause type, and a vocal type.

The kinesics type may at least one of a body movement, other than a facial expression, and the facial expression, and the internal states type may indicate at least one of an intention and an emotion, and the pause type may indicate a passage of time, and the voice type may indicate at least one of an addressee, a number of speakers, a tone, a volume, a speed, a pitch, and a timbre.

Extracting the nonverbal message may include analyzing, by the machine learning model, determining a context of the one of the sentences based on determining a context of a pre-set number of the sentences both before and after the one of the sentences.

Extracting the nonverbal message may be based on minimizing $\Sigma_{t \in V} L(t,\theta)$, where V represents a set of nonverbal message extraction instances, $\theta$ represents parameters of an extraction model of the machine learning model, L is defined by $L(t,\theta) = -\log p_{start,\theta}(a_{start}|t) - \log p_{end,\theta}(a_{end}|t)$, where t represents an instance of the at least one sentence, where $p_{start}$ and $p_{end}$ are vectors representing estimated probabilities of a token of an answer span a, and $a_{start}$ and $a_{end}$ respectively represent a start offset and an end offset of answer span a.

The machine learning model may be trained based on minimizing a corruption objective $$\sum\nolimits_{t \in T} L(t, \theta_e, \theta_d) \text{ over } t \text{ as } L(t, \theta_e, \theta_d) = -\log p_{\theta_e,\theta_d}(y_t \mid x_t),$$

where $y_t$ represents an the nonverbal message of the sentence, $x_t$ represents a context within a pre-set distance of the sentence, and $\theta_e$ and $\theta_d$ represent the parameters of the machine learning model.

The annotation may be based on determining a probability $$p(n \mid U) = \prod\nolimits_{i=1}^{m} p(n_i \mid U, n_1, \dots, n_{i-1})$$

where U represents utterances of the sentences, where n represents nonverbal messages including the nonverbal message.

Receiving the text may include inputting at least one of a movie script and a novel into the machine learning model.

The at least one sentence may indicate that a speaker uttered a speech, and the annotation may indicate that the speech was uttered as a shout.

The text may indicate a plurality of speakers.

BRIEF DESCRIPTION OF THE DRAWINGS

Further features, nature, and various advantages of the disclosed subject matter will be more apparent from the following detailed description and the accompanying drawings in which:

FIG. 3 is a simplified flow diagram in accordance with embodiments;

FIG. 5 is a simplified illustration in accordance with embodiments;

FIG. 6 is a simplified illustration in accordance with embodiments;

FIG. 8 is a simplified flow diagram in accordance with embodiments;

FIG. 10 is a simplified illustration in accordance with embodiments;

FIG. 12 is a simplified illustration in accordance with embodiments;

FIG. 13 is a simplified illustration in accordance with embodiments;

FIG. 14 is a simplified illustration in accordance with embodiments;

FIG. 15 is a simplified illustration in accordance with embodiments;

FIG. 19 is a simplified flow diagram in accordance with embodiments; and

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
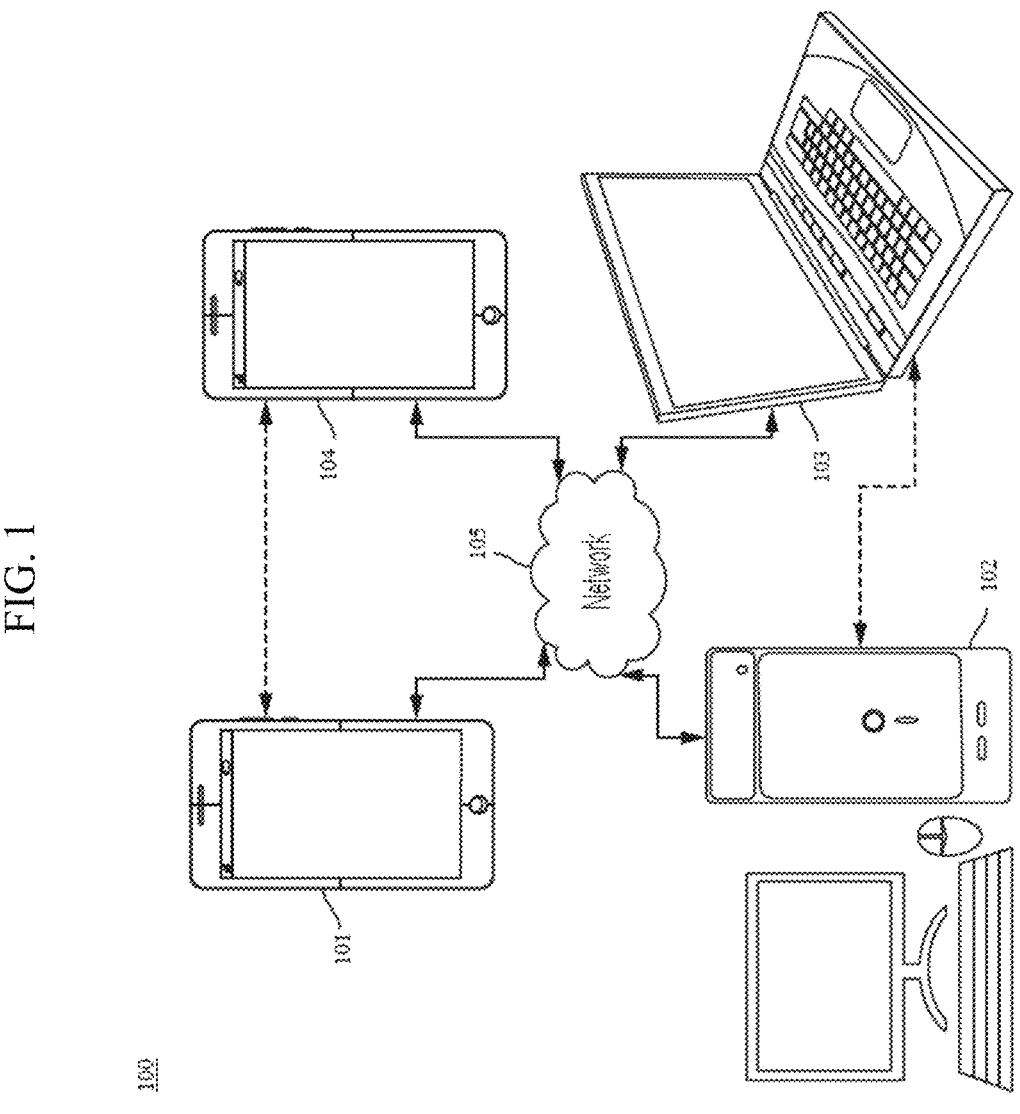
FIG. 1 is a schematic illustration of a diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
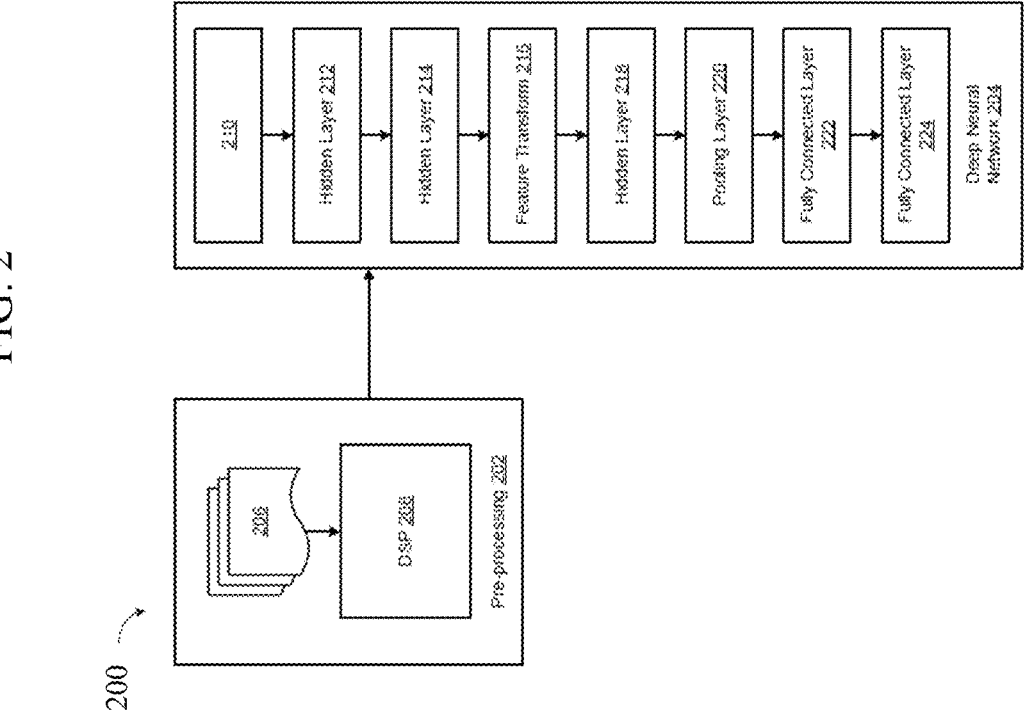
FIG. 2 is a simplified block diagram in accordance with embodiments.

Referring to FIG. 2, a block diagram of an system 200 according to exemplary embodiments is depicted. FIG. 2 may be described with the aid of the exemplary embodiments depicted in FIG. 1. According to one or more embodiments, the system 200 may be located on a computer, a server, a collections of computers, a cloud computing environment, etc. The system 200 may accordingly include, among other things, a pre-processing module 202 and a deep neural network 204. The pre-processing module 202 may contain a digital signal processing (DSP) module 208 and may be configured to retrieve data 206. According to one embodiment, the data 206 may be retrieved from a data storage device. In an alternative embodiment, the data 206 may be retrieved from the database 112 (FIG. 1) on the server computer 114. The data 206 may include, among other things, raw ECG data collected from a patient. According to one embodiment, the data 206 may be a full 24-48 hour, long-term collection period. According to an alternative embodiment, the data 206 may be a random sample of the collection period. According to still another alternative embodiment, the data 206 may be a sample of the collection period having a highest variance value. The DSP module 208 may extract one or more RR intervals from the data 206 by segmenting the data for each individual heartbeat. This may be accomplished, for example, by calculating a time interval between peaks of successive R waves. Thus, the DSP module 208 may, among other things, assist in converting a one-dimensional time signal corresponding to ECG data into a multi-dimensional array for processing by the deep neural network 204. The DSP module 208 may also apply data cleaning and filtering to the data 206 for better processing by the deep neural network 204.

The deep neural network 204 may include, among other things, an input matrix 210; one or more hidden layers 212, 214, and 218; a feature transform layer 216; a pooling layer 220; and one or more connected layers 222 and 224. It may be appreciated that FIG. 2 depicts only one implementation of a deep neural network 204, and that the deep neural network 204 is not limited to these exact layers and order of layers. The deep neural network 204 may contain any number of layers in any order, including adding or omitting any of the depicted layers.

The input matrix 210 may, for example, be a two-dimensional matrix with dimensions n by k, whereby n may be a number of RR intervals selected for analysis (i.e., the number of heartbeats) and k−1 may be a number of previous RR intervals for each of the RR intervals. For example, if 128 RR intervals were to be analyzed with a lookback window of three previous RR intervals for each of the 128 RR intervals, input matrix would have a size of 128 by 4. However, it may be appreciated that n and k may be any values that may be selected based on available computation power, such that more neighborhood information may be kept for each heartbeat for larger k values.

The feature transform layer 216 may be used to extract one or more features. While only one feature transform layer 216 is depicted, it may be appreciated that the deep neural network 204 may contain additional feature transform layers 216 that may be applied to the data 206 in series or in parallel. The one or more hidden layers 212, 214, and 218 may be used to further process the data into a form usable by the deep neural network 204. The pooling layer 220 may be used to aggregate one or more features and down-sample the data analyzed for ease of identifying one or more features. The pooling layer 220 may apply a max-pooling strategy, an average-pooling strategy, or other pooling methods. The first fully connected layer 222 may be used, for example, to classify the aggregated features and to compare the features to one or more patterns. The patterns may be developed through deep learning, such that no human intervention may be present in the creation of the patterns. The second fully connected layer 224 may be used to classify whether the data 206 contains a pattern by analyzing the output of the first fully connected layer 222. The second fully connected layer 224 may, for example, apply an indicator function to the data, such as outputting a "1" if the data contains a pattern and outputting a "0" if the data does not.

According to exemplary embodiments, as there is no public dataset in any language for identifying NMs in unstructured corpora, there is first introduced here an NM annotation guideline and analysis of annotated dataset nonverbal message extraction (NME).

Figure 3:
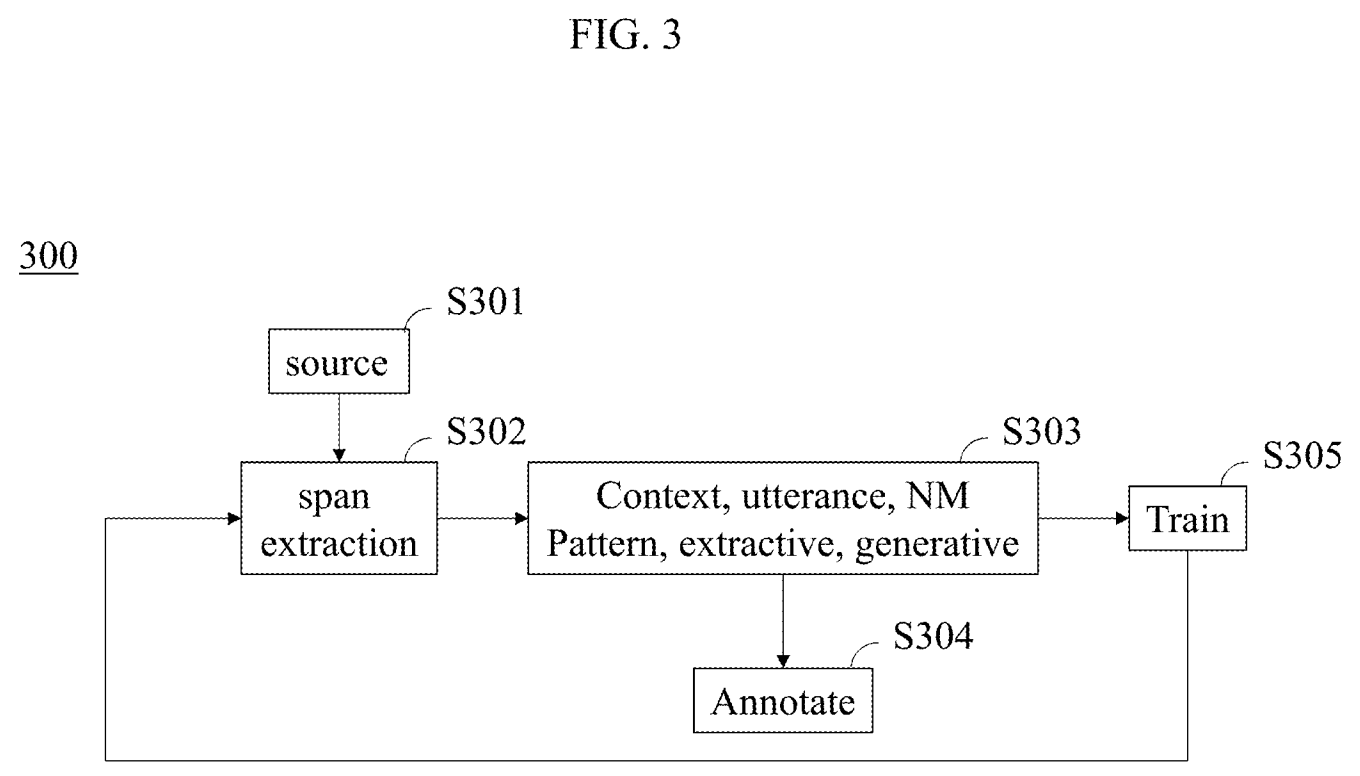

According to exemplary embodiments, see example 300 of FIG. 3 where the annotation task is designed to select one or multiple spans, at S302, (can be non-adjacent) from the surrounding texts of a given utterance, or source at S301, so as to simplify the annotation task by copying the writers' words and avoid the annotators' interpretations that can be inaccurate. Since there can exist several NMs in the context, embodiments at S303 may only keep those that occur a short time before the utterance is spoken or at the same time, as they are more relevant to the target utterance (such as within a predetermined number of phrases or sentences, such as 5 phrases or sentences before and after the target, though this number is adjustable according to embodiments). The speakers of the utterances may not be included in the selected spans. In addition, embodiments may not annotate relatively uninformative NM that only contains one or multiple of the three common speech verbs alone "说" and "道" (both means "said") and "问" ("asked"). However, for consistent annotations, embodiments ask the annotators, which may be based on machine learning, to include these speech verbs when they appear right after other NMs such as "摇头道" ("shook head and said") and "笑道" ("smiled and said"). As an utterance may have a relatively uninformative NM or not be surrounded by any narrative texts, the annotated NM can be empty such as the last utterance "Our enmity is as deep as the ocean . . . " as in example 400 of FIG. 4.

Figure 4:
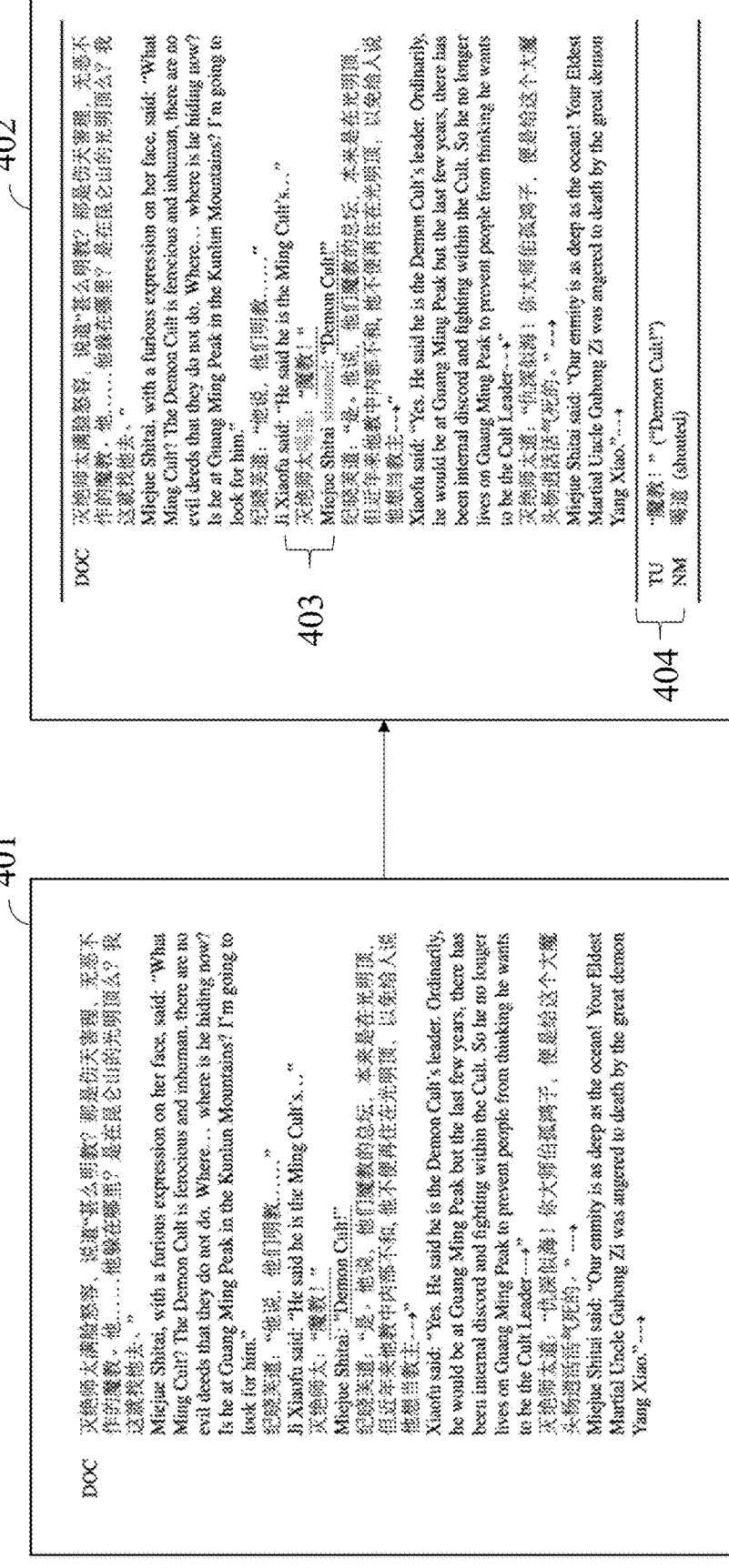
FIG. 4 is a simplified illustration in accordance with embodiments.

Therefore, and as discussed further herein, embodiments construct unannotated NM data, such as example 401, based on a public speaker identification dataset in which novels are involved, and the number of novels may be three for the example 400 shown in FIG. 4. And embodiments may use the annotated target utterance, its labeled speaker, and ten-sentence context (five sentences before/after the utterance) without any modifications and follow the data split. As "speaker: utterance" are regarded as two sentences separated by ":" in the dataset, the actual number of sentences in the context may be smaller than ten. Each instance (example 400) is annotated by two annotators, and all annotators are Chinese native speakers.

The example 400 illustrates that, according to embodiments, an annotated NME dataset may be achieved where annotations 403 and 404 are added to example 402 as compared to original text at example 401.

The writers of novels tend to omit the NM when the utterance or the context is self-explanatory. Besides, instances with relatively uninformative NMs are discarded. Therefore, embodiments may only keep 67.4% of the annotated utterances, and each instance corresponds to one or multiple non-empty nonverbal messages. This may be seen from the NME statistics 500 shown in FIG. 5 according to exemplary embodiments and improves computational efficiency.

Figure 6:
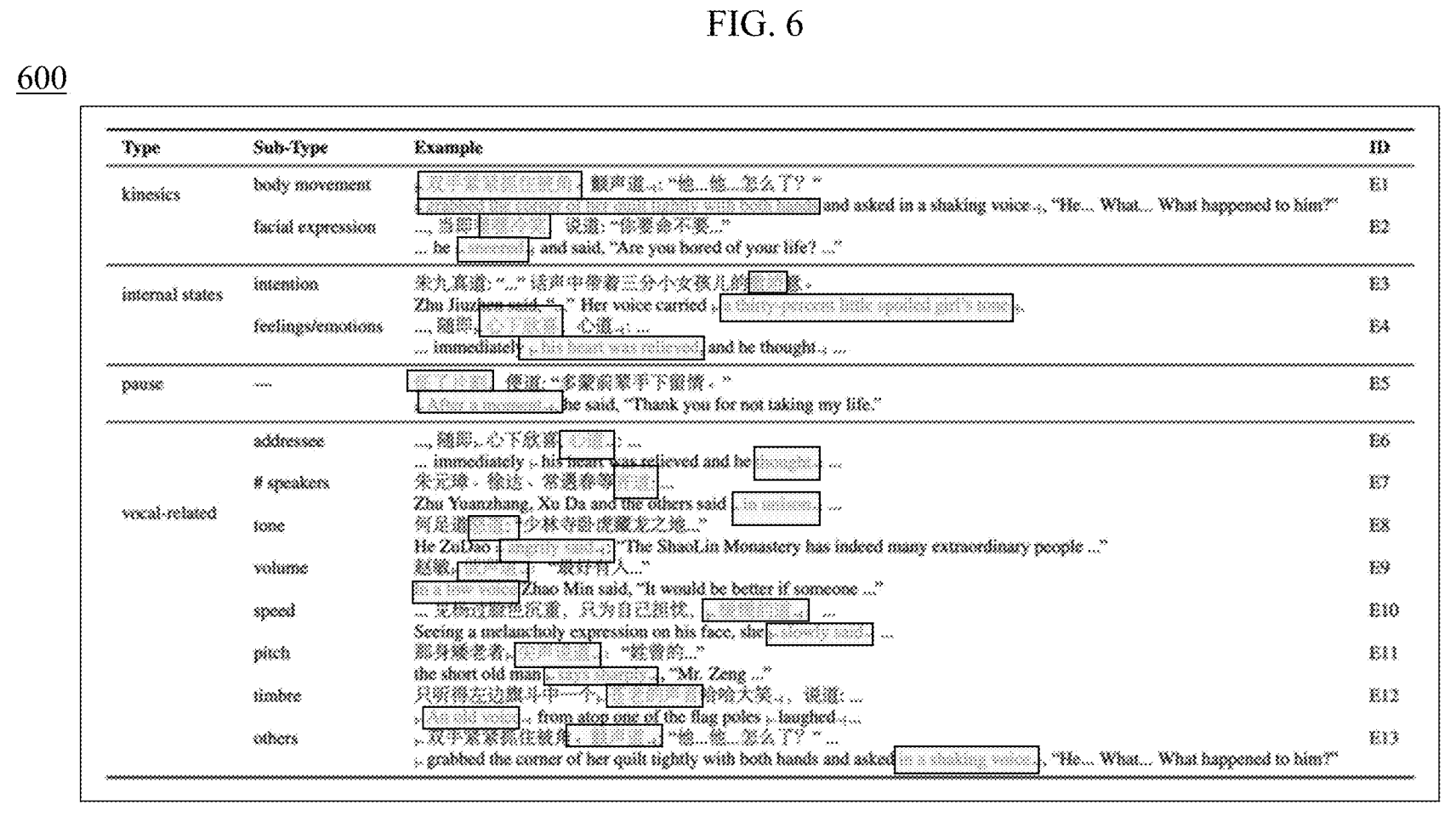
Figure 7:
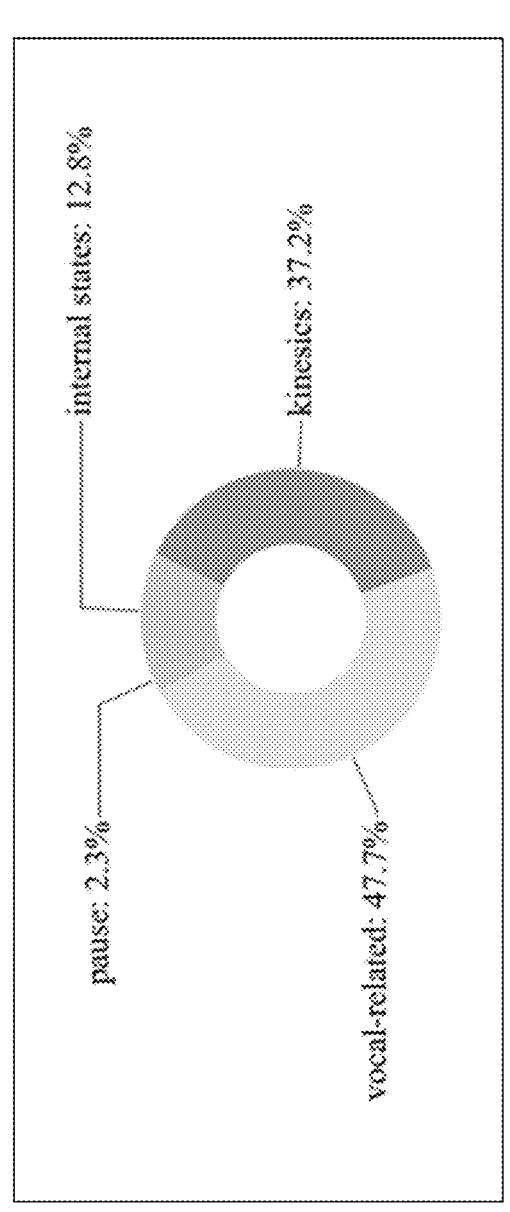
FIG. 7 is a simplified illustration in accordance with embodiments.

To examine fine-grained types of NMs, embodiments review the literature, analyze the annotated spans, and finally categorize them into thirteen sub-types, as shown in example 600 of FIG. 6, according to exemplary embodiments. An NM may belong to multiple sub-types. For example, "陪笑" ("put up a smiling face in order to please or placate somebody") indicate both a facial expression and an intention, and "均想"" ("both think") shows both the number of speakers and the addressee (the "⊢" and "⊣" indicate start and end positions of one annotated NM). As shown in the distribution of NM types example 700 of FIG. 7, the two most frequent types may be vocal-related (e.g., pitch, volume, and speed) and kinesics (i.e., body movement and facial expression), which are more expressive than other types such as intention and therefore more likely to support downstream applications in other modalities such as speech and vision.

According to exemplary embodiments, there are NME pattern-based methods where the S304 annotations and S305 training may be achieved by removing from considerations speaker names and utterances when S302 extracting NMs. As the writers' own observations that may contain NMs take place alternating with utterances of characters, embodiments may assume that an NM is very likely to appear in the same paragraph as the given target utterance. Therefore, embodiments may first run a strong (~90% in F1) extractive speaker identification model over the paragraph to identify the speaker of the target utterance. As utterance annotations are unavailable in unlabeled novels, embodiments use double quotation marks to segment utterances and regard the first one as the target utterance. Then embodiments may remove all utterances and the speaker from the paragraph, separated the remaining context by commas, and use the last span as the NM of the target utterance to reduce noise. For example, given a paragraph "Miejue Shitai shouted "Demon Cult!" as in FIG. 4, embodiments regarding pattern-based extractor extracts "shouted" as the NM of the underlined utterance. However, these embodiments may inevitably suffer from relatively low recall (e.g., 63.1% in macro-averaged recall on the dev set of NME). For example, given the context of E6 in example 600, both "heart was relieved" and "thought" should be regarded as NMs while this method can only extract "thought".

Figure 8:
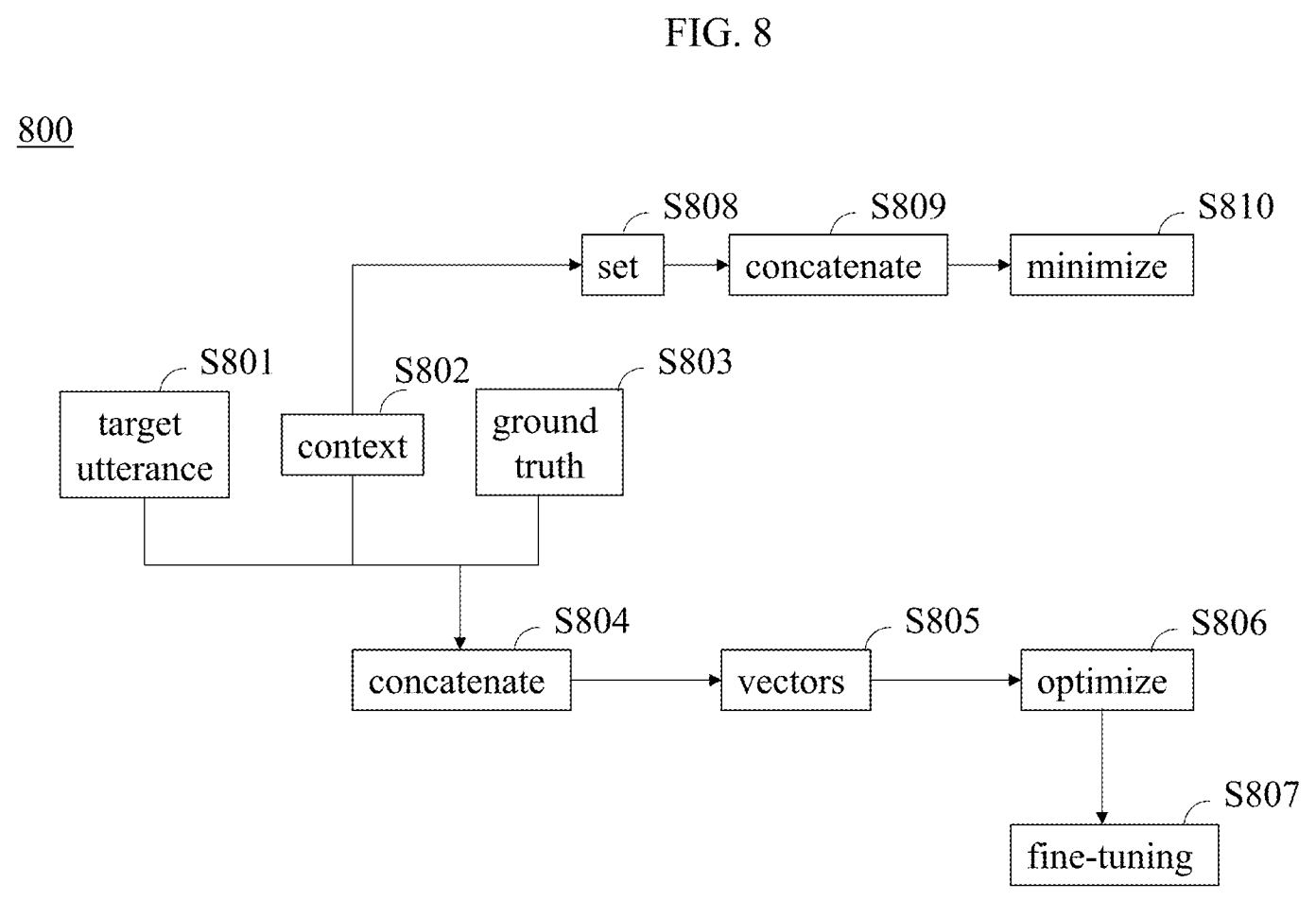

Therefore, embodiments also use an extractive method. As a nonverbal message mention must be a one or multiple spans in the context surrounding the target utterance, embodiments consider an extractive machine reading comprehension (MRC) formulation that originally aims to extract an answer of a given question from a document. Viewing example 800 of FIG. 8, embodiments regard the target utterance u as the question, at S801, and regard the surrounding context of u as well as u as document d, at S802. The ground truth nonverbal message of u is treated as the answer a, at S803. Embodiments, at S804, concatenate a special token [CLS], tokens in u, a special token [SEP], and tokens in d as the input sequence. The [SEP] token may indicate when a next sentence starts for a next sentence prediction (NSP) task. The [CLS] token may be added to a sequence A and a sequence B to form the input, where a target of [CLS] is whether a sequence B indeed follows a sequence A in the corpus. At S805, two vectors $p_{start}$ and $p_{end}$ are introduced to represent the estimated probabilities of each token in d to be the start or end token of the correct answer span a that appears in d, respectively. Let $a_{start}$ and $a_{end}$ denote the start offset and end offset of a, respectively. Embodiments, ay S806, optimize the extractive model with parameters θ by minimizing $\Sigma_{t \in V} L(t, \theta)$, where V represents the set of NM extraction instances, and L is defined as:

$$L(t, \theta) = -\log p_{start,\theta}(a_{start}|t) - \log p_{end,\theta}(a_{end}|t) \qquad \text{Eq. (1)}$$

However, embodiments using such classical extractive architecture may only extract a single span from the context, though there are some extensions to extract multiple spans. For those instances with multiple NMs, embodiments may use the longest common substring of the context and the concatenation of these NMs as the actual answers for training at S305, and the original labels for validation. To further improve on these embodiments, multi-span formulations are also further described below.

For example, to address the single-span limitation of the above extractive method, embodiments also employ a generative method, in which nonverbal message extraction may be regarded as a text-to-text task in which: the extractor is fed the surrounding context S802 of the target utterance and is asked to generate the NM of this utterance. For NMs that are, at S808, a set of non-contiguous spans, embodiments at S809 concatenate them using commas to form the ground truth labels. Further, there may then, at S810, be minimization of a corruption objective $\Sigma_{t \in T} L(t, \theta_e, \theta_d)$ to train, at S305, an encoder-decoder model over data T:

$$L(t, \theta_e, \theta_d) = -\log p_{\theta_e, \theta_d}(y_t|x_t) \qquad \text{Eq. (2)}$$

where output $y_t$ is the NM of the given utterance in instance t, input $x_t$ is the surrounding context of this utterance, and $\theta_e$ and $\theta_d$ represent the parameters for the encoder and decoder, respectively.

In the input sequence, the preceding/following context may be separated by special tokens [SEP]. Embodiments have experimented with different types of input, shown in example 1000 of FIG. 10. Despite the advantage of extracting multi-span messages, compared with the faithful NMs extracted by the pattern-based and extractive methods, generative methods may have hallucination issues.

As such, there may be large-scale weak data construction according to embodiments in which a pattern-based extractor and a speaker identification model, both described above, are implemented to extract (context, utterance, NM) candidates with non-empty NMs from hundreds of novels. For data quality control, embodiments discard those instances whose NMs have more than nine characters or are relatively uninformative. Note if the paragraph before the target utterance also contains utterances, embodiments use their speaker and the last utterance (separated by a colon) as the context to make the data format consistent with that of scripts. If no utterance exists in the previous paragraph, all the content of the paragraph is used as context. To obtain the NMs extracted by the trained extractive and generative extractors, which are used to replace pattern-based NMs in (context, utterance, NM) triples, embodiments use the paragraph that includes the target utterance and its previous paragraph as context for inference. In summary, embodiments construct the same number of (context, utterance, NM) triples using each of the three extraction methods introduced in this section to extract corresponding NMs.

Further, according to exemplary embodiments, there is NM generation that given a history context sequence, such as at S802, that contains k utterances or narratives U={$u_1$, $u_2$, ..., $u_k$}, use a task that aims to generate a natural language nonverbal message n={$n_1$, $n_2$, ..., $n_m$} for speaker of the k-th utterance $u_k$, where m denotes the maximum possible number of words in the NM, in the training S305 and annotation S304. The probability of the NM is formulated as:

$$p(n|U) = \prod_{i=1}^{m} p(n_i|U, n_1, ..., n_{i-1}) \qquad \text{Eq. (3)}$$

Similar to the generative extraction method described above, such embodiments adopt the text-to-text formulation, described above, and train, at S305, the generator with a maximum likelihood to predict the target sequence.

Figure 9:
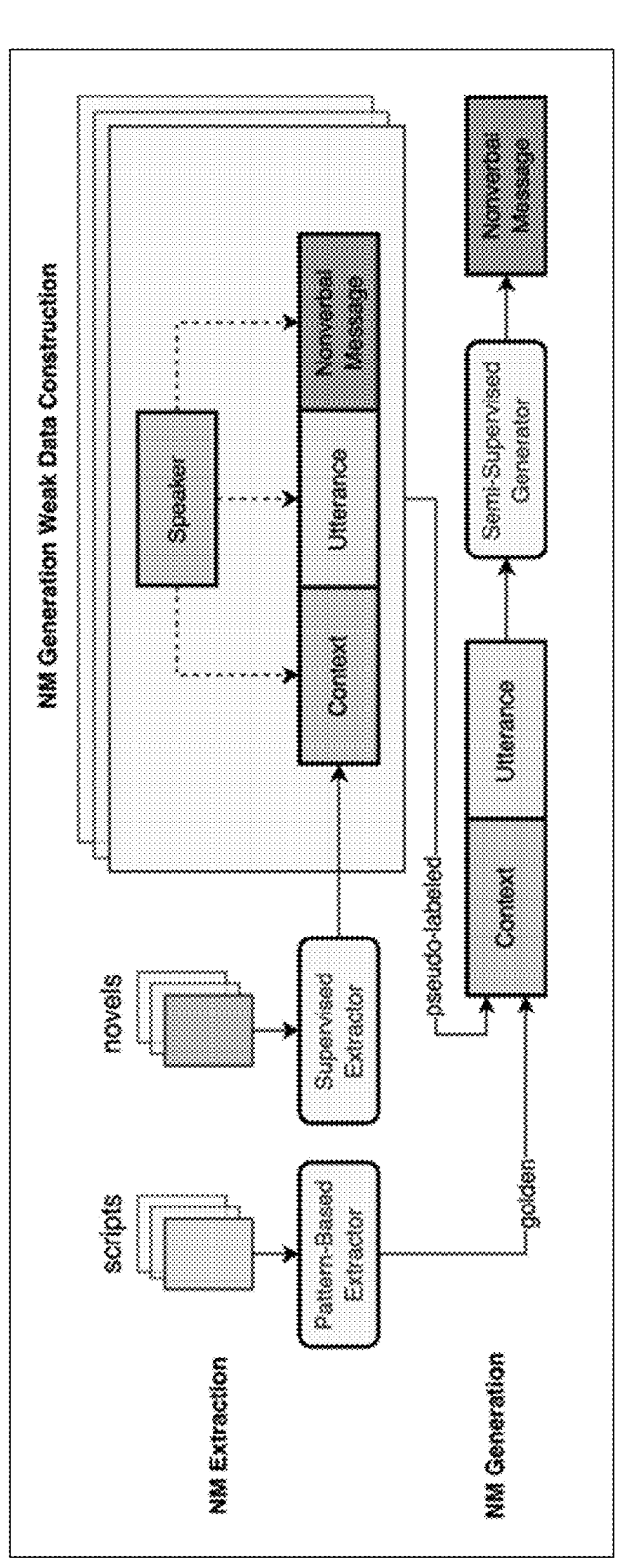
FIG. 9 is a simplified illustration in accordance with embodiments.

Such training paradigm with automatically constructed data leverages weakly-labeled nonverbal message generation instances constructed by extraction methods discussed above by two-stage fine-tuning at S807, where embodiments first fine-tune a generator on a combination of the clean and weak-labeled data and then fine-tune the resulting generator on the clean data alone. Such framework is illustrated in example 900 of FIG. 9 which shows a supervised extractor trained on NME.

In light of the above and for extractive baselines, embodiments consider both encoder-only (such as RoBERTa-wwm-ext-large and MacBERT) and encoder-decoder models (such as T5$_{base}$, BART$_{large}$, and DialBART$_{large}$). Note that Dial-BART$_{large}$ is obtained by fine-tuning BART$_{large}$ on LUGE$_{dialoged}$ as described below. The above encoder-decoder models are also used for generative NM extractors and NM generators according to embodiments which also may discard the tokens from the bottom of the input if its length exceeds the maximum model sequence length. Experiments according to exemplary embodiments have been implemented on eight NVIDIA-V100 32 GB GPUs. Each experiment has ran five times with different random seeds and results are provided below shown the efficacy of the exemplary embodiments described above.

Further, as part of that experimentation, there has been used Chinese scripts to construct clean NM generation data, collecting scripts from a script website and keeping 454 scripts after filtering those with format issues. There was use of triples extracted from non-overlapped scripts as training and dev sets to avoid data leakage. The most recent 50 scripts were used for the dev set.

There was also collected 521 Chinese novels for weak-labeled NM generation data construction and experiment results are provided with two weak NM generation data of different sizes: Novel (397K) and $Novel_L$ (749K), and Novel is a subset of $Novel_L$.

Further, a commonsense knowledge approach was also used where a context-utterance-NM triple was regarded as a piece of commonsense knowledge, as they both are usually ignored and assumed to be known without being told. Thus, embodiments have used the human-annotated argument pairs such as ("someone holds an umbrella", "it is raining") in the Chinese set of commonsense knowledge by regarding the two arguments as the input and the NM, respectively. The context was left empty.

Further, for $LUGE_{dialogue}$, there was contained four Chinese dialogue datasets: Chinese Persona Chat (CPC), LCCC, Emotional STC (ESTC), and KdConv, and embodiments indirectly used $LUGE_{dialogue}$ by using $DialBART_{large}$ that is fine-tuned on this dataset as the backbone model to study the usefulness of dialogue generation datasets for NM generation.

Further, for $C^3$ and EWECT: there was considered, for dialogue/narrative understanding tasks, a multiple-choice MRC dataset $C^3$ and an emotion classification dataset EWECT (the general-domain version) to investigate the impact of introducing generated NMs into dialogue tasks without NMs.

Figure 11:
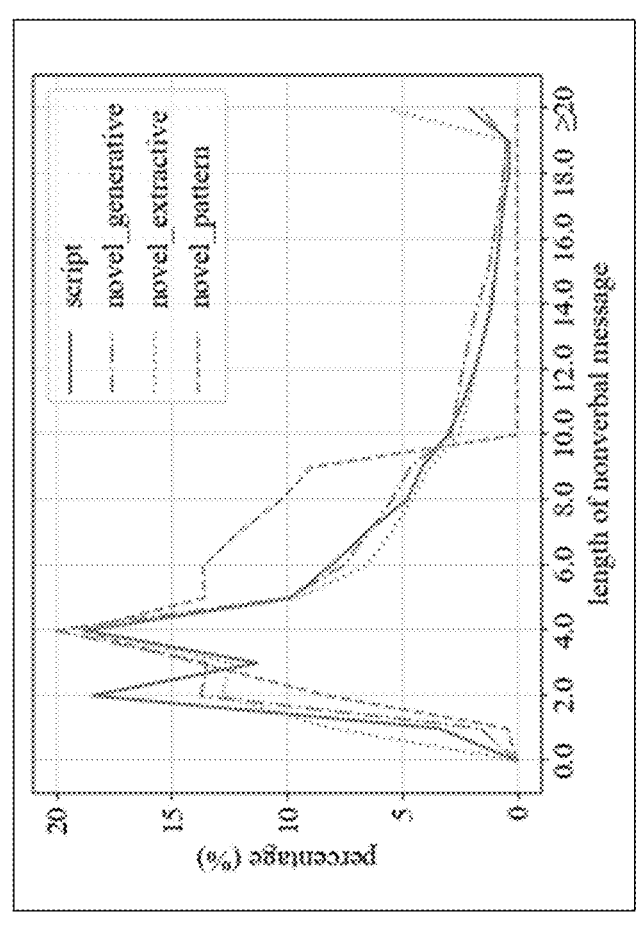
FIG. 11 is a simplified illustration in accordance with embodiments.

The example 1000 in FIG. 10 illustrates results of NM extraction evaluation where it is clear that supervised extractors outperform the pattern-based method. It was found hereby that including the target utterance in the input hurts the performance of generative methods even though the utterance boundary is indicated by [SEP]. Methods such as increasing the training data size (clean or noisy) of NME according to embodiments help models learn to focus on the writers' words for identifying NMs. The length distribution of the NMs extracted by embodiments supervised extractors is very similar to that of the clean NMs in Script as shown in example 1100 of FIG. 11; note that the sharp drop in the pattern-based NM distribution is caused by the length constraint set for weak data construction. The example 1100 represents the nonverbal message extraction performance on the NME dataset (cat: concatenation; $context_1$: context before the target utterance. $context_2$: context after the target utterance. EM: exact match) and length distribution of nonverbal messages extracted by scripts and the embodiments' three methods.

For experimental results of NM generation methods of embodiments herein, for the majority baseline, there was use the most frequent NM (1.03%), "笑" ("smile"), in the training set of the Script as the NMs for all utterances. It was noticed that a model pre-fine-tuned on dialogue generation datasets $LUGE_{dialogue}$ performs better on NM generation (6 vs. 4 in example 1200 of FIG. 12). For semi-supervised training, embodiments experimented with two backbone models ($T5_{base}$ and $DialBART_{large}$) and consistent gains (10 vs. 3) (15/18 vs. 6) were seen over the purely supervised baselines trained on Script. Introducing more weakly-labeled data was also helpful (18 vs. 15).

The example 1200 of FIG. 12 represents the nonverbal generation average performance and standard deviation on the dev set of the Script (→>: two-stage fine-tuning. *: as $DialBART_{large}$ is pre-fine-tuned on $LUGE_{dialogue}$).

Further, the impact of context and speaker ID was considered, and to investigate the impact of context on NM generation, there was removal the context from the training instances. In other words, inputs becomes the target utterance alone. There was use of $T5_{base}$ for the ablation studies. Based on the input sequence we there was use in the main experiments, and additionally adding of extra preceding context (i.e., one narrative or utterance) or the speaker(s) of the target utterance $u_k$. As shown in the example 1300 of FIG. 13, the context before the target utterance is important for NM generation, while introducing more history context ($u_{k-2}$) or speaker(s) of $u_k$ does not lead to notable performance improvement. Also, the result indicates that other dialogue-related datasets without speaker information may also be considered to be used for improving NM generation.

The example 1300 represents findings of the impact of introducing context and speaker information for semi-supervised training based on the automatically constructed data ($Novel_{generative}$) ($u_k$: the k-th utterance, i.e., the target utterance, $s_k$: the speaker of the target utterance; different components in the input are separated by [SEP]).

Also, human evaluation of results of embodiments herein were also considered, and there was random sampling of 100 instances from the held-out set of Script and randomly shuffle the label and automatically generated NMs for each instance. Given the context, target utterance, and an NM, human annotators were asked to rate each NM using the following four binary metrics: (M1) the relevance between the utterance and the NM based on the context, (M2) the fluency of the NM, (M3) the validity of the NM, and (M4) the factual consistency of the NM based on the context and utterance. For the NM generation human evaluation, the human agreement (x) is measured using Cohen's kappa. For all four metrics, x=0.55 (moderate agreement). When not considering the hallucination issue in M4 as ground truth NM label cannot be judged using this metric, x=0.64 (substantial agreement). Similar to observations when automatic metrics are used, models trained with automatically extracted data achieve better performance over the purely supervised baseline trained with Script as reported in example 1400 of FIG. 14.

Example 1400 of FIG. 14 represents human evaluation (%) on the held-out set of Script (M1: relevance, M2: fluency, M3: validity, M4: consistency, AVG4/3: average of M1-4 and M1-3).

There was also considered aspects of evaluations on natural language understanding tasks where it was studied whether the predicted NMs (by different generators in example 1200) can in turn help dialogue/narrative understanding tasks. There was adopted the pre-released baselines released, and for each utterance in the input of each instance, there was added a predicted NM after the utterance while keeping other settings unchanged. For example, for $$C_D^3$$

that aims to select the correct answer option of a question based on a dialogue, one modified dialogue example (English translation) is "Female: Hey, where are you? We are all waiting for you! (hurriedly shouting) Male: Immediately, I'll be there soon! I've already got off the bus, and I'm on my way to you! (hurriedly said)". There was conducted the same procedure for EWECT that aims to identify the emotional state of a writer or speaker. As shown in the example 1500 of FIG. 15, significant improvements by introducing the NMs into the original tasks were achieved in a human-interpretable way compared with the same implemented baseline without considering NMs, and NMs have a similar impact as the clean commonsense and script knowledge on the two tasks.

The example 1500 of FIG. 15 represents the accuracy (%) of introducing NMs into $$C_D^3$$

and EWECT (mpu*: number of added NMs per utterance in the original input. RoBERTa$_{LARGE}$: RoBERTa-wwm-ext-large. §: copied from [11] and top-1 team's report from the EWECT website.

‡: $p$−value < 0.005.†: $p$−value < 0.05).

Aspects of BERT is also discussed below.

Figure 16:
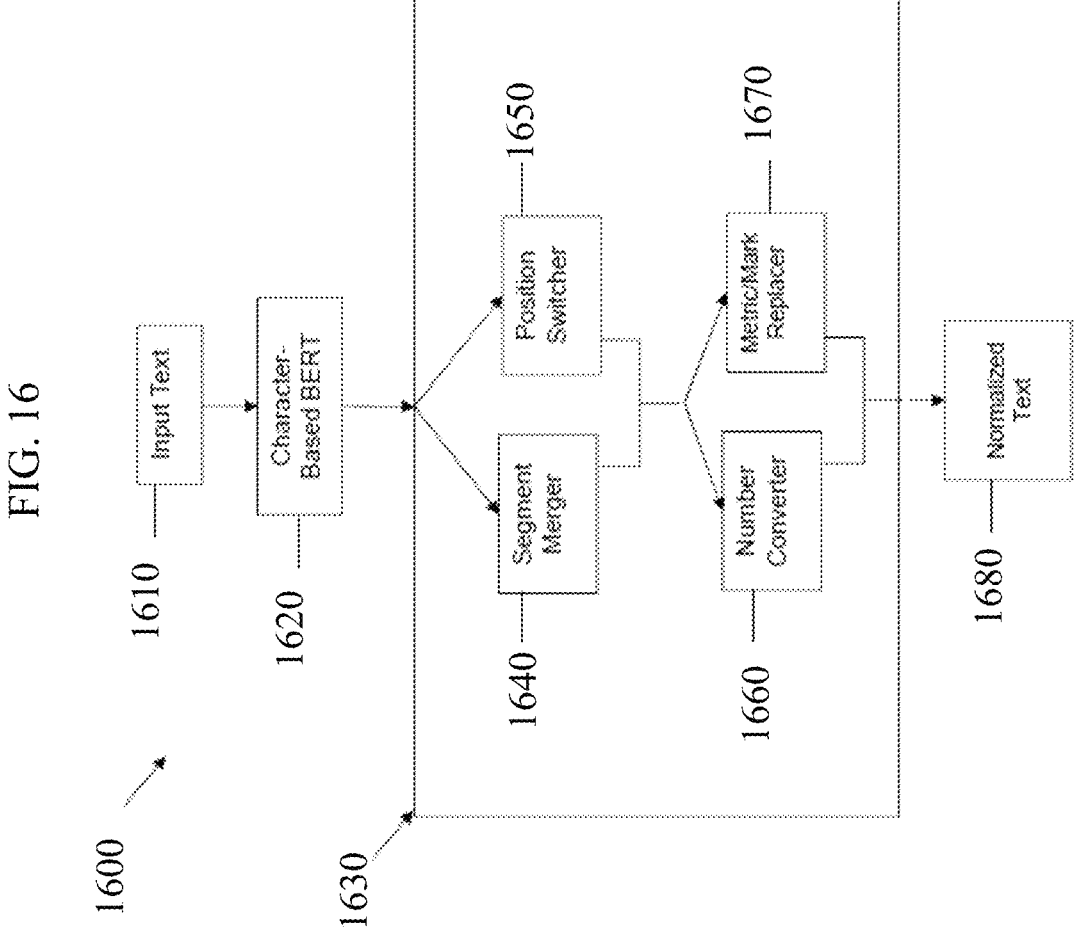
FIG. 16 is a simplified flow diagram in accordance with embodiments.

FIG. 16 details one embodiment of the text normalization apparatus 1600. The text normalization apparatus 1600 comprises an input text 1610, fed into a character based Bidirectional Encoder Representations from Transformers (BERT) 1620. The output of the BERT 1620 is then acted upon by a rules based model 1630. The rules based model 1630 further comprises a segment converter 1640, a position switcher 1650, a number converter 16560 and a metric/mark replacer 1670. After processing in the tag-based converter 1630, the normalization apparatus 1600 finally outputs a normalized text 1680. The text normalization apparatus 1600 may be comprised of additional blocks, such as additional rule layers, different size BERT modules as well as additional checking and operational computations.

The input text 1610 comprises a string of text made of combinations of characters comprising text and other marks such as punctuation. For example, the input text 1610 may be a string such as a date. Dates, typically contain a mixture of marks and text. There a variety of forms containing the same information such as "Feb. 2, 2014" or "2/2/14." Other examples may be text messages which typically contain other marks such as emojis or emails which contain a variety of punctuation such as the "@" mark. Another example of input text 1610 may be metrics or measurements, which can sometimes be ambiguous without context. For example, "16M" may refer to "sixteen megabytes" or "sixteen meters" depending on the reading. Finally, as a non-exhaustive list, the input text 1610 may be math, a website url, program code, language text, combination of languages, any combination of the previously listed examples or any unique mark.

After receiving the input text 1610, the text normalization apparatus 1500 passes the text to the character based BERT 1520. The character based BERT 1620 is fully trained and labels ach character by predefined tags. In some embodiments the BERT 1620 is a full-size BERT or in other embodiments a one-layer BERT model. The one layer BERT is generally faster than the full-size BERT, however the smaller sized module may induce a performance drop such as larger error rates. One way to make up for the drop is adding Conditional Random Field (CFR) loss function which labels the segment as a whole instead of independent characters. Other embodiments may use the full-sized BERT alongside the CFR loss function, the one-layer BERT without the CFR or the full-size BERT without the CFR loss function.

After tagging the input text the BERT 1620 passes the information to the rules based model 1630. The rules based model 1630 takes the tagged text and parses through the text and finally creates a normalized text output 1680. Inside the rules based model are two stages, the first comprising the segment merger 1640, the position switcher 1650 and the second comprising the number converter 1660 and the metric/mark replacer 1670. To normalize the text, the rules based model passes the tagged input text through each stage comprising a variety of rules.

The text passes through each rule of the first stage to begin. For convenience, the segment merger 1640 will be described first. The segment merger 1640 mergers similar characters together to retain their meaning. For example, when converting a date, the merger takes separate strings such as "February", "2" and "2014" and merges them together to form 2014/02-02 in order for the text to be properly read by a machine or other computer device.

The position switcher 1650 switches the position of the input string such that when read, the normalized text places the words in the correct order. For example, in languages that dictated the type of a thing before the value, such as "12.5%" in Chinese, where the percentage is pronounced before the numbers, the position switcher 1650 switches the percent sign to be read before the numeric value. Switching may also take place for any text where the meaning is better preserved by changing the place of characters or words within an input text.

After passing through the first stage, the string of text is processed by the second stage comprising a number converter 160 and a metric/mark replacer 1670. The number converter 16560, converts number to text. For example, the input may be the string "48" and after the number converter converts the string to text, the string will read "forty-eight" as an output. The metric/mark replacer 1670 searches through the text for any punctuation marks or other commonly used abbreviations or other random symbols/characters and replaces them with the word representation. As an example, the metric/mark replacer 1670 takes an input string of "&" and replaces it with "and" as an output. Other metrics/marks may contain emojis, slang, symbols, pictographs, divergent spellings, ascii art, or other pictographic items that convey meaning. Finally, the after the string has been fully processed, the string is outputted as normalized text 1680.

Figure 17:
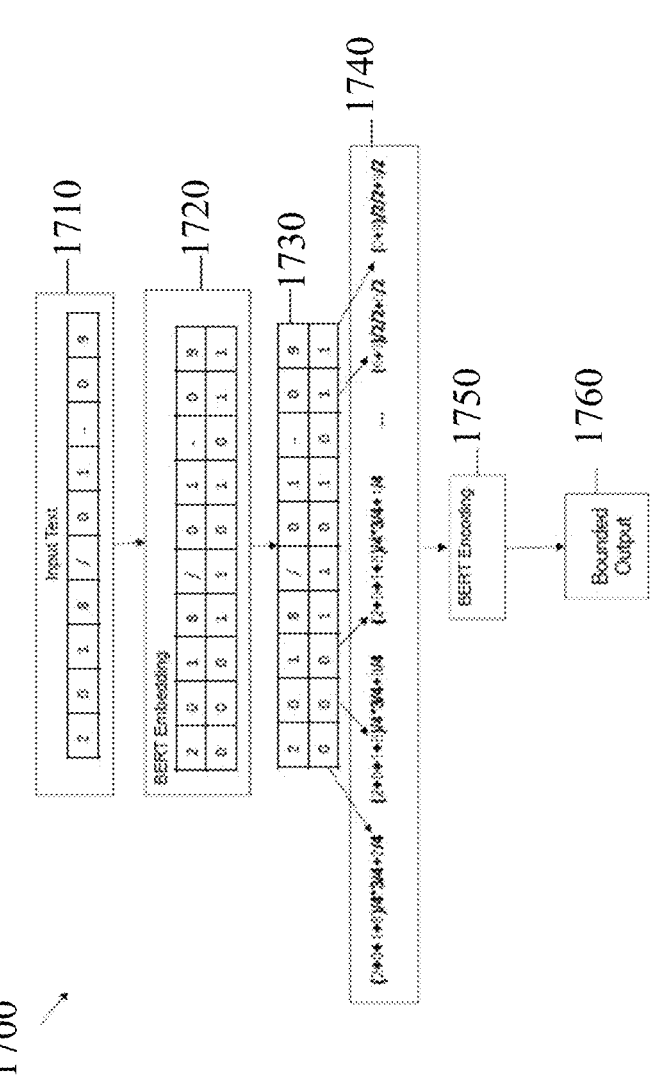
FIG. 17 is a simplified flow diagram in accordance with embodiments.

FIG. 17 details the phrase-based attention 1700, and the process of determining the phrase boundaries as part of input for BERT. The phrase based attention 1700 is comprised of an input text 1710, a BERT embedding 1720, an embedded string 1730, the phrase embedding 1740, BERT encoding 1750 and a bounded output 1760. As an example, the input text 1710 contains the date "2018/01-09" for processing. As discussed above the input text 1710 may be any text or other pictographic material. The input text 1710 is then passed to the BERT embedding 1720 to be labeled for processing. In the BERT embedding 1720, the label is defined as 0 for non-boundary and 1 for ending of the phrase. For example "2018" has label "0001".

After the embedding is calculated, the character embedding is replaced by phrase embedding 1740, which is the average of all character embedding in this phrase with or without the extra weight for that character. Here, as an example, the phrase "2018/01-09" gains the weight in the calculation shown in FIG. 17. After the character embedding is processed the next part is the BERT Encoding 1750. Finally the BERT encoder takes the attention weight would be calculated based on the phrase embeddings and produces a bounded output 1760.

Figure 18:
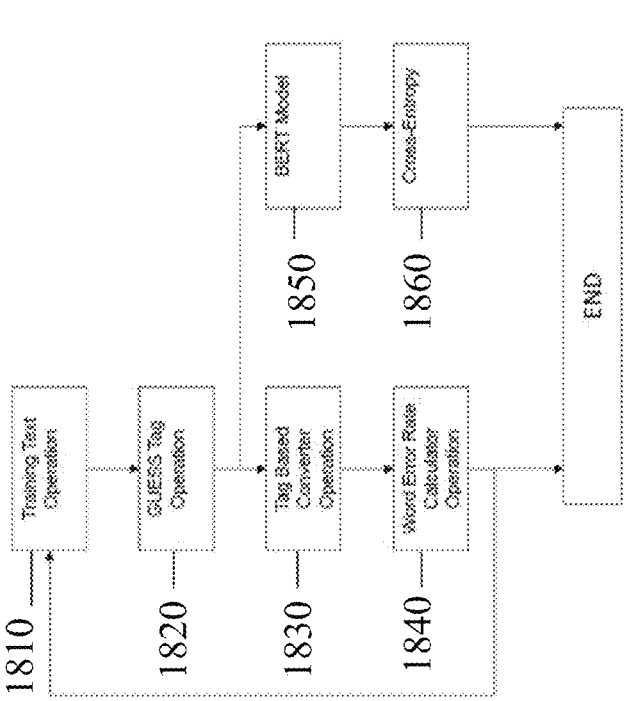
FIG. 18 is a simplified flow diagram in accordance with embodiments.

FIG. 18 depicts an exemplary training method 1800 for the tag based converter. The training method 1800 comprises a training text 1810, a GUESS tag 1820, the tag based converter 1830 and a word error rate calculator 2840. Additionally, the training method has the BERT model 1850 and a cross entropy calculator 1860. Operationally, the training begins with a training text 1810 fed into the GUESS tag 1820 which makes a guess as to the type of text present in the input text 2810. The GUESS tag 1820 First, tags for each character are sorted by character tag frequencies. This operation generates weak supervision information which is easy to obtain. Second, continuous digits share the same tag. Finally, estimate the computation cost in advance and limit to top 5 possible tags if the predicted time cost is large.

After the guess tags are applied to the input text it passes to both the tag based tag based converter 1830 and the BERT model 1850. For sake of convenience the tag based converter 430 and the word Error rate 440 will be discussed first. The tag based converter 1830 converts the input text string to text based upon the tags from the GUESS tag 420. For example the tag based converter 1830 may convert numbers and symbols to text. Then after converting to text, the string is passed to the word error rate checker (WER) which checks the amount of errors generated after conversion. With a high number of errors the conversion is sent back through the process with a different tag to retrain the method in order to reduce the number of errors. If the WER is low, take training takes only those sentences with zero WER and uses them to train the BERT model 1850. Next, the BERT model 1850 is applied to help guess labels and the second BERT model 18450 is trained with relabeled corpus. The output of the BERT model 1850 is taken and the cross entropy 1860 is calculated.

Figure 19:
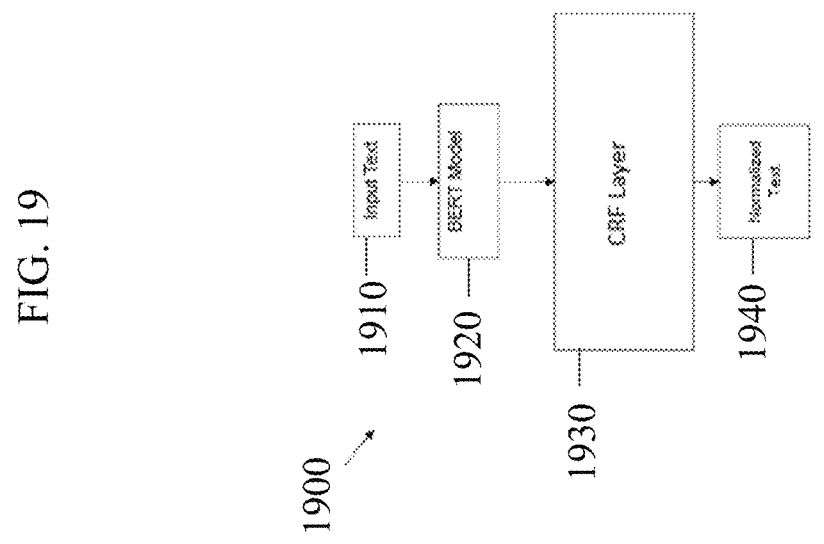

FIG. 19 details one embodiment of the text normalization apparatus 1900. The text normalization apparatus 1900 comprises an input text 1910, fed into a character based Bidirectional Encoder Representations from Transformers (BERT) 1920. The output of the BERT 1920 is then acted upon by Conditional Random Fields (CFR) 1930. After operation in the CFR 1930, the normalization apparatus 1900 finally outputs a normalized text 1940.

The input text 1910 comprises a string of text made of combinations of characters comprising text and other marks such as punctuation. For example, the input text 1910 may be a string such as a date. Dates, typically contain a mixture of marks and text. There a variety of forms containing the same information such as "Feb. 2, 2014" or "2/2/14." Other examples may be text messages which typically contain other marks such as emojis or emails which contain a variety of punctuation such as the "@" mark. Another example of input text 110 may be metrics or measurements, which can sometimes be ambiguous without context. For example, "16M" may refer to "sixteen megabytes" or "sixteen meters" depending on the reading. Finally, as a non-exhaustive list, the input text 1910 may be math, a website url, program code, language text, combination of languages, any combination of the previously listed examples or any unique mark.

After receiving the input text 1910, the text normalization apparatus 1900 passes the text to the character based BERT 1920. The character based BERT 1920 is fully trained and labels ach character by predefined tags. In some embodiments the BERT 1920 is a full-size BERT or in other embodiments a one-layer BERT model. The one layer BERT is generally faster than the full-size BERT, however the smaller sized module may induce a performance drop such as larger error rates. After tagging the input text the BERT 1920 passes the information to the rules CFR 1930. The Conditional Random Field (CFR) loss function which labels the segment as a whole instead of independent characters. The CFR 1930 takes the tagged text and parses through the text and finally creates a normalized text output 2940.

Viewing the experimental results provided herein and embodiments of this disclosure, there is provided the technical improvement of enabling extracting NMs from unstructured corpora. Embodiments, annotate the first NM extraction dataset for based on novels and develop three baselines to extract single-span or multi-span NM of a target utterance from its surrounding context. Furthermore, embodiments use the extractors to extract 749K (context, utterance, NM) triples from novels and investigate whether use improves NM generation via semi-supervised learning. Experimental results demonstrate that the automatically extracted triples can serve as high-quality augmentation data of clean triples extracted from scripts to generate more relevant, fluent, valid, and factually consistent NMs than the purely supervised generator, and the resulting generator can in turn help dialogue understanding tasks such as dialogue machine reading comprehension and emotion classification by simply adding the predicted "unspoken" NM to each utterance or narrative in inputs.

For example, instead of scripts, novels also contain rich NMs via the words of the writers alongside what their characters speak, and thousands of novels have already been adapted into scripts (mainly by professional scriptwriters). Besides, by experimental results reported herein, there has been observed that the density of NMs in novels is higher than that of scripts (~67.4% based on the annotated corpus, indicating the potential of leveraging novels for NM extraction. Therefore, embodiments show use this unstructured resource to alleviate the NM data scarcity problem, which hinders the full utilization of deep neural models. As this direction had not been unexplored, embodiments first define the task as extracting one or multiple spans from the surrounding context of the target utterance and annotate NME, the first Nonverbal Message Extraction dataset based on three novels containing 4K (context, utterance, NM) instances. Furthermore, there is employed three baselines (pattern, extractive, and generative) to extract NMs and evaluate them on NME.

Embodiments herein answer the question whether the computer can leverage unlabeled novel corpora to automatically construct data for improving NM generation. For example, embodiments use the trained extractors to extract 749K pseudo-labeled instances from several hundreds of novels and train generators based on different backbone models to generate a nonverbal message given one target utterance and its context. Experiments show that these triples can serve as high-quality augmentation data of clean triples extracted from well-structured scripts to generate more relevant, fluent, valid, and factually consistent NMs. Furthermore, the semi-supervised generators according to embodiments can in turn help Chinese dialogue and narrative understanding tasks that lack NMs such as the dialogue subset of a machine reading comprehension dataset C3 and emotion classification EWECT by simply adding the generated "unspoken" NMs to each utterance or narrative in inputs, showing their usefulness.

As such, embodiments herein provide for design and annotation of a first NM extraction dataset based on unstructured corpora, several strong nonverbal message extraction and generation baselines upon different backbone models, extraction of large-scale (context, utterance, NM) data from unlabeled unstructured corpora using the NM extractors and demonstration of the usefulness of the data for improving the performance of NM generation, and experimental results shown herein indicate that NM generators can in turn help dialogue understanding tasks in computer technology.

Figure 20:
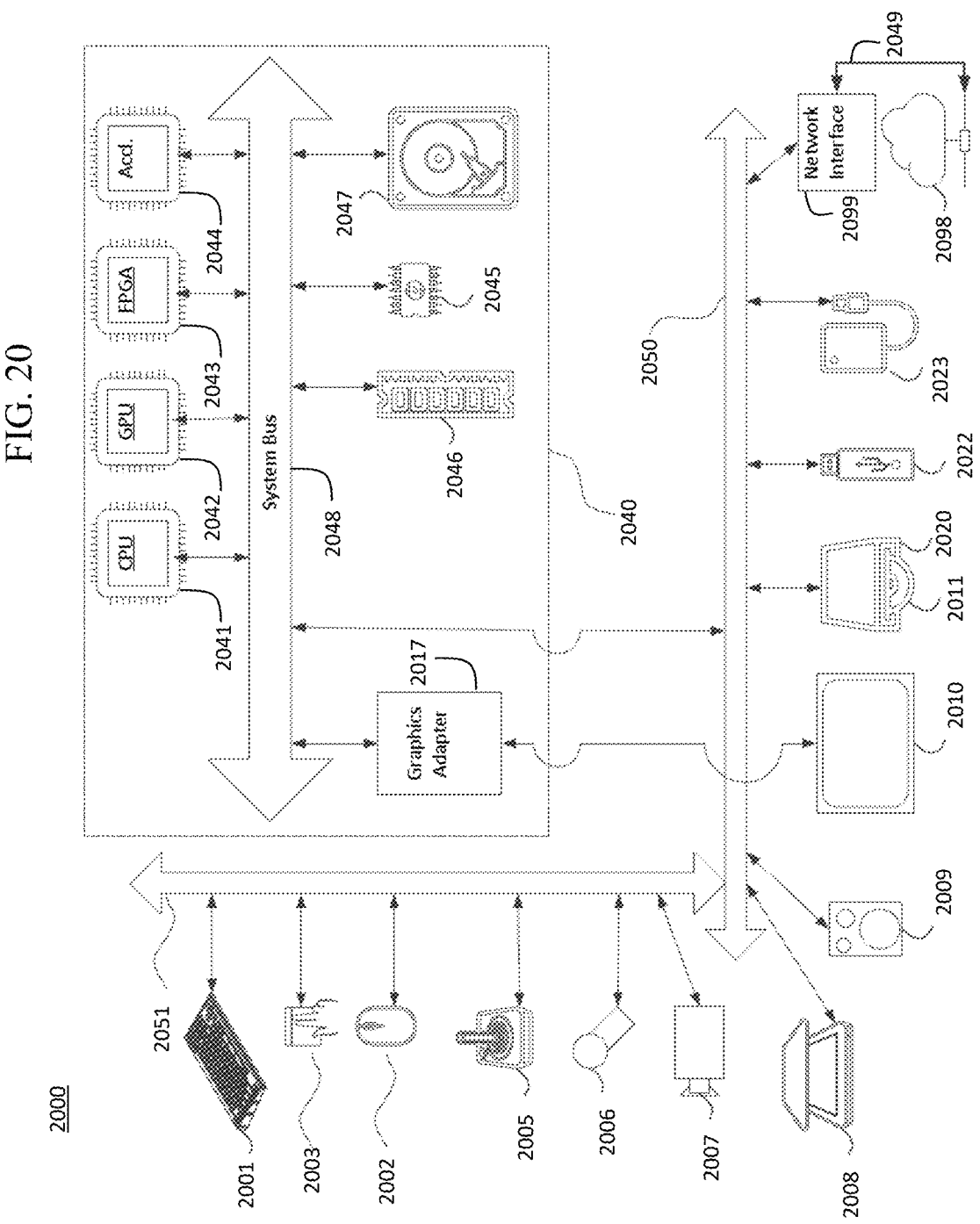
FIG. 20 is a simplified illustration in accordance with embodiments.

The techniques described above, can be implemented as computer software using computer-readable instructions and physically stored in one or more computer-readable media or by a specifically configured one or more hardware processors. For example, FIG. 20 shows a computer system 2000 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 12 for computer system 2000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 2000.

Computer system 2000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 2001, mouse 2002, trackpad 2003, touch screen 2010, joystick 2005, microphone 2006, scanner 2008, camera 2007.

Computer system 2000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 2010, or joystick 2005, but there can also be tactile feedback devices that do not serve as input devices), audio output devices (such as: speakers 2009, headphones (not depicted)), visual output devices (such as screens 2010 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 2000 can also include human accessible storage devices and their associated media such as optical media including CD/DVD ROM/RW 2020 with CD/DVD 2011 or the like media, thumb-drive 2022, removable hard drive or solid state drive 2023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 2000 can also include interface 2099 to one or more communication networks 2098. Networks 2098 can for example be wireless, wireline, optical. Networks 2098 can further be local, wide-area, metropolitan, vehicular and industrial, real-time, delay-tolerant, and so on. Examples of networks 2098 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 2098 commonly require external network interface adapters that attached to certain general-purpose data ports or peripheral buses (2050 and 2051) (such as, for example USB ports of the computer system 2000; others are commonly integrated into the core of the computer system 2000 by attachment to a system bus as described below (for example Ethernet interface into a PC computer system or cellular network interface into a smartphone computer system). Using any of these networks 2098, computer system 2000 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 2040 of the computer system 2000.

The core 2040 can include one or more Central Processing Units (CPU) 2041, Graphics Processing Units (GPU) 2042, a graphics adapter 2017, specialized programmable processing units in the form of Field Programmable Gate Areas (FPGA) 2043, hardware accelerators for certain tasks 2044, and so forth. These devices, along with Read-only memory (ROM) 2045, Random-access memory 2046, internal mass storage such as internal non-user accessible hard drives, SSDs, and the like 2047, may be connected through a system bus 2048. In some computer systems, the system bus 2048 can be accessible in the form of one or more physical plugs to enable extensions by additional CPUs, GPU, and the like. The peripheral devices can be attached either directly to the core's system bus 2048, or through a peripheral bus 2049. Architectures for a peripheral bus include PCI, USB, and the like.

CPUs 2041, GPUs 2042, FPGAs 2043, and accelerators 2044 can execute certain instructions that, in combination, can make up the aforementioned computer code. That computer code can be stored in ROM 2045 or RAM 2046. Transitional data can be also be stored in RAM 2046, whereas permanent data can be stored for example, in the internal mass storage 2047. Fast storage and retrieval to any of the memory devices can be enabled through the use of cache memory, that can be closely associated with one or more CPU 2041, GPU 2042, mass storage 2047, ROM 2045, RAM 2046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 2000, and specifically the core 2040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 2040 that are of non-transitory nature, such as core-internal mass storage 2047 or ROM 2045. The software implementing various embodiments of the present disclosure can be stored in such devices and executed by core 2040. A computer-readable medium can include one or more memory devices or chips, according to particular needs. The software can cause the core 2040 and specifically the processors therein (including CPU, GPU, FPGA, and the like) to execute particular processes or particular parts of particular processes described herein, including defining data structures stored in RAM 2046 and modifying such data structures according to the processes defined by the software. In addition or as an alternative, the computer system can provide functionality as a result of logic hardwired or otherwise embodied in a circuit (for example: accelerator 2044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor and comprising:

receiving a text comprising a plurality of sentences;

by a machine learning model, extracting a nonverbal message from one of the sentences and adding an annotation to the text, the annotation indicating the nonverbal message, and the annotation is based on determining a probability

18

$$p(n|U) = \prod_{i=1}^{m} p(n_i|U, n_1, \dots, n_{i-1})$$

where U represents utterances of the sentences, where n represents nonverbal messages including the nonverbal message, and where m represents a number of words of the nonverbal message; and outputting a version of the text comprising the annotation.

2. The method according to claim 1, wherein extracting the nonverbal message comprises determining a type of the nonverbal message, the type being at least one of a kinesics type, an internal states type, a pause type, and a vocal type.

3. The method according to claim 2, wherein the kinesics type indicates at least one of a body movement, other than a facial expression, and the facial expression, wherein the internal states type indicates at least one of an intention and an emotion, wherein the pause type indicates a passage of time, wherein the voice type indicates at least one of an addressee, a number of speakers, a tone, a volume, a speed, a pitch, and a timbre.

4. The method according to claim 1, wherein extracting the nonverbal message comprises analyzing, by the machine learning model, determining a context of the one of the sentences based on determining a context of a pre-set number of the sentences both before and after the one of the sentences.

5. The method according to claim 4, wherein extracting the nonverbal message is based on minimizing $\Sigma_{t \in V} L(t,\theta)$, where V represents a set of nonverbal message extraction instances, $\theta$ represents parameters of an extraction model of the machine learning model, L is defined by $L(t,\theta) = -\log p_{start,\theta}(a_{start}|t) - \log p_{end,\theta}(a_{end}|t)$, where t represents an instance of the at least one sentence, where $p_{start}$ and $p_{end}$ are vectors representing estimated probabilities of a token of an answer span a, and $a_{start}$ and $a_{end}$ respectively represent a start offset and an end offset of answer span a.

6. The method according to claim 5, wherein the machine learning model is trained based on minimizing a corruption objective $\Sigma_{t \in T} L(t,\theta_e,\theta_d)$ over t as $L(t,\theta_e,\theta_d) = -\log p_{\theta_e,\theta_d}(y_t|x_t)$, where $y_t$ represents an the nonverbal message of the sentence, $x_t$ represents a context within a pre-set distance of the sentence, and $\theta_e$ and $\theta_d$ represent the parameters of the machine learning model.

7. The method according to claim 1, wherein receiving the text comprises inputting at least one of a movie script and a novel into the machine learning model.

8. The method according to claim 1, wherein the at least one sentence indicates that a speaker uttered a speech, and wherein the annotation indicates that the speech was uttered as a shout.

9. The method according to claim 1, wherein the text indicates a plurality of speakers.

10. An apparatus comprising:

at least one memory configured to store computer program code;

at least one processor configured to access the computer program code and operate as instructed by the computer program code, the computer program code including:

receiving code configured to cause the at least one processor to receive a text comprising a plurality of sentences;

extracting and annotating code configured to cause the at least one processor to, by a machine learning model, extracting a nonverbal message from one of the sentences and adding an annotation to the text, the annotation indicating the nonverbal message, and the annotation is based on determining a probability $$p(n|U) = \prod_{i=1}^{m} p(n_i|U, n_1, \ldots, n_{i-1})$$

where U represents utterances of the sentences, where n represents nonverbal messages including the nonverbal message, and where m represents a number of words of the nonverbal message; and outputting code configured to cause the at least one processor to output a version of the text comprising the annotation.

11. The apparatus according to claim 10, wherein extracting the nonverbal message comprises determining a type of the nonverbal message, the type being at least one of a kinesics type, an internal states type, a pause type, and a vocal type.

12. The apparatus according to claim 11, wherein the kinesics type indicates at least one of a body movement, other than a facial expression, and the facial expression, wherein the internal states type indicates at least one of an intention and an emotion, wherein the pause type indicates a passage of time, wherein the voice type indicates at least one of an addressee, a number of speakers, a tone, a volume, a speed, a pitch, and a timbre.

13. The apparatus according to claim 10, wherein extracting the nonverbal message comprises analyzing, by the machine learning model, determining a context of the one of the sentences based on determining a context of a pre-set number of the sentences both before and after the one of the sentences.

14. The apparatus according to claim 13, wherein extracting the nonverbal message is based on minimizing $\Sigma_{t \in V} L(t,\theta)$, where V represents a set of nonverbal message extraction instances, $\theta$ represents parameters of an extraction model of the machine learning model, L is defined by $L(t,\theta)=-\log p_{start,\theta}(a_{start}|t)-\log p_{end,\theta}(a_{end}|t)$, where t represents an instance of the at least one sentence, where $p_{start}$ and $p_{end}$ are vectors representing estimated probabilities of a token of an answer span a, and $a_{start}$ and $a_{end}$ respectively represent a start offset and an end offset of answer span a.

15. The apparatus according to claim 14, wherein the machine learning model is trained based on minimizing a corruption objective $\Sigma_{t \in T} L(t,\theta_e,\theta_d)$ over t as $L(t,\theta_e,\theta_d)=-\log p_{\theta_e,\theta_d}(y_t|x_t)$, where $y_t$ represents an the nonverbal message of the sentence, $x_t$ represents a context within a pre-set distance of the sentence, and $\theta_e$ and $\theta_d$ represent the parameters of the machine learning model.

16. The apparatus according to claim 10, wherein receiving the text comprises inputting at least one of a movie script and a novel into the machine learning model.

17. The apparatus according to claim 10, wherein the at least one sentence indicates that a speaker uttered a speech, and wherein the annotation indicates that the speech was uttered as a shout.

18. A non-transitory computer readable medium storing a program causing a computer to:

receive a text comprising a plurality of sentences;

by a machine learning model, extract a nonverbal message from one of the sentences and add an annotation to the text, the annotation indicating the nonverbal message, and the annotation is based on determining a probability $$p(n|U) = \prod_{i=1}^{m} p(n_i|U, n_1, \ldots, n_{i-1})$$

where U represents utterances of the sentences, where n represents nonverbal messages including the nonverbal message, and where m represents a number of words of the nonverbal message; and output a version of the text comprising the annotation.

\* \* \* \* \*